(12) United States Patent
Williams

(10) Patent No.: US 7,674,327 B2
(45) Date of Patent: Mar. 9, 2010

(54) FLEXOGRAPHIC INK COMPOSITIONS

(75) Inventor: Barry Williams, Cartersville, GA (US)

(73) Assignee: Global Printing Solutions, Inc., Acworth, GA (US)

( * ) Notice: Subject to any disclaimer, the term of this patent is extended or adjusted under 35 U.S.C. 154(b) by 436 days.

(21) Appl. No.: 11/260,811

(22) Filed: Oct. 27, 2005

(65) Prior Publication Data

US 2006/0086285 A1    Apr. 27, 2006

Related U.S. Application Data

(60) Provisional application No. 60/622,379, filed on Oct. 27, 2004.

(51) Int. Cl.
    *C09D 11/00* (2006.01)
(52) U.S. Cl. .................. 106/31.4; 106/31.41; 106/31.6; 106/31.72; 106/31.73; 106/31.13
(58) Field of Classification Search .............. 106/31.41, 106/31.4, 31.36, 31.13, 31.6, 31.72, 31.73
    See application file for complete search history.

(56) References Cited

U.S. PATENT DOCUMENTS

| 4,173,554 | A |   | 11/1979 | Sulzberg |            |
|-----------|---|---|---------|----------|------------|
| 4,963,188 | A |   | 10/1990 | Parker   |            |
| 5,004,763 | A |   | 4/1991  | Imagawa  |            |
| 5,066,331 | A | * | 11/1991 | Hutter   | 524/272    |
| 5,106,417 | A | * | 4/1992  | Hauser et al. | 524/104 |
| 5,192,361 | A |   | 3/1993  | Schilling |           |
| 5,208,319 | A | * | 5/1993  | Schilling | 530/210   |
| 5,281,264 | A |   | 1/1994  | Ono et al. |          |
| 5,405,932 | A |   | 4/1995  | Bender et al. |       |
| 5,407,474 | A |   | 4/1995  | Airey et al. |        |
| 5,658,968 | A |   | 8/1997  | Catena et al. |       |
| 5,667,571 | A | * | 9/1997  | Ono et al. | 106/31.48 |
| 5,677,363 | A |   | 10/1997 | Imagawa  |            |
| 5,698,668 | A |   | 12/1997 | Bender   |            |
| 5,762,696 | A | * | 6/1998  | Jordan   | 106/226    |
| 5,844,071 | A | * | 12/1998 | Williams et al. | 530/210 |
| 5,972,088 | A | * | 10/1999 | Krishnan et al. | 106/31.73 |
| 6,071,989 | A | * | 6/2000  | Sieber et al. | 523/351 |
| 6,334,890 | B1 |  | 1/2002  | Goodbrand et al. |    |
| 6,432,192 | B1 | * | 8/2002 | Cook et al. | 106/496 |
| 6,582,804 | B2 | * | 6/2003 | Wu et al. | 428/195.1 |
| 6,632,859 | B1 | * | 10/2003 | Jones et al. | 523/160 |
| 2002/0023571 | A1 | * | 2/2002 | Rathschlag et al. | 106/415 |
| 2004/0127681 | A1 |  | 7/2004 | Kutsek |            |
| 2004/0175515 | A1 | * | 9/2004 | Lawrence et al. | 428/32.1 |

FOREIGN PATENT DOCUMENTS

JP        63-213583      9/1988

OTHER PUBLICATIONS

2-Pyrrolione Consortium. U.S. EPA HPV Challenge Program Submission for 2-Pyrrolidone. Dec 30, 2002. p. 8-9. http://www.epa.gov/hpv/pubs/summaries/2pyrroli/c14223tp.pdf.*

* cited by examiner

*Primary Examiner*—Karl E Group
*Assistant Examiner*—Noah S Wiese
(74) *Attorney, Agent, or Firm*—Thomas, Kayden, Horstemeyer & Risley, LLP; Todd Deveau

(57) ABSTRACT

Flexographic ink vehicles, ink additives and printing ink compositions are disclosed. The compositions include at least two naturally occurring polymers in the form of naturally occurring rosins or resins, in particular esters of rosins or resins or salts thereof. In an exemplary embodiment the compositions include a maleic modified rosin and a fumaric modified rosin, in particular esters and ester salts thereof.

57 Claims, No Drawings

FLEXOGRAPHIC INK COMPOSITIONS

CROSS REFERENCE TO RELATED APPLICATION

This application claims priority to and benefit of U.S. Provisional Patent Application entitled "Flexographic Ink Compositions", assigned Ser. No. 60/622,379, and filed on Oct. 27, 2004, which is incorporated by reference in its entirety.

BACKGROUND

1. Technical Field

This disclosure generally relates to ink vehicles, ink additives and ink compositions. More particularly, it relates to flexographic ink vehicles, ink additives and flexographic ink compositions with a polymer component having at least two naturally occurring rosins, resins or esters thereof.

2. Related Art

Several printing processes have been developed, and each process generally requires a specific ink composition specially formulated for that particular printing process. The particular ink formulations generally compensate for differing printing conditions between different printing processes and differing print substrates. For example, ink compositions for lithographic printing are considerably different than ink compositions for flexographic printing due in part to different types of printing systems used in the two processes.

Today lithography is generally synonymous with offset lithography. Offset lithography uses water-insoluble ink compositions. Offset lithography printing systems typically include three printing cylinders, an inking system, and a dampening system. The three printing cylinders include a plate cylinder, a blanket cylinder, and an impression cylinder. As the plate cylinder rotates, the plate contacts dampening rollers and then inking rollers. The dampening rollers apply moisture to the non-printing areas of the plate cylinder. Because lithographic inks are immiscible in water, the moisture applied by the dampening systems helps keep the lithographic ink from coating the non-printing areas of the plate. The printing areas of the plate cylinder are generally inked with an oil-based ink composition. The water-insoluble ink composition cannot bleed into the moistened non-printing areas of the plate cylinder.

In contrast, flexographic printing processes use water-based or solvent based ink compositions. Flexographic printing systems are generally systems having rubber or photopolymer plates, reverse-angle doctor blades, and ceramic anilox rollers in central impression cylinder presses. Flexographic presses can be used to print books, newspaper inserts, and packaging materials. Because flexographic printing systems can use water soluble or water-based ink compositions which are less expensive than oil-based ink compositions, flexographic printing typically costs less than lithographic printing. Despite the lower cost of water-soluble ink compositions, the use of these water-based inks does have its share of problems.

For example, current water-based ink compositions often contribute to "Ghosting". "Ghosting" is an unwanted condition that occurs when an image on a press sheet also appears faintly elsewhere on the same press sheet. Other flexographic inks have poor gloss, increased solids in wastewater streams, poor transferability, and rewetting problems, among others.

Current methods for solving problems related to flexographic printing of water-based ink compositions include increasing pigment concentration in the ink composition and/or using finer pigments. These approaches tend to increase the cost of the ink and have not proven successful in overcoming the problems with current inks, particularly ghosting.

Accordingly, there is a need for improved flexographic ink compositions and flexographic ink vehicles.

SUMMARY

In general, aspects of the disclosure are directed to water soluble or water miscible flexographic ink compositions and water soluble or water miscible flexographic ink vehicles and additives. The disclosed ink vehicles and additives typically include at least two naturally occurring polymers. Suitable naturally occurring polymers include naturally occurring rosins and resins, in particular esters of rosins and resins. Exemplary polymers include tree rosins, tall oil rosins and gum rosins, and esters and modified esters and salts thereof. In one aspect, a first polymer includes, but is not limited to, a maleic modified rosin or resin, and the second polymer includes, but is not limited to, a fumaric modified rosin or resin, in particular a fumaric modified ester of tall oil rosin. The polymers can be suspended in aqueous solution or water soluble solvent, for example about 25 to about 75 wt. % of water, typically about 50 to about 60 wt. % water for the ink vehicle, and typically about 30 to about 50 wt. % water for the ink additive. Additional water soluble polymers can be added as needed.

Other aspects provide flexographic ink compositions in which one or more colorants are combined with the disclosed ink vehicle. Representative colorants include, but are not limited to, conventionally available organic and inorganic pigments, metal oxides, metal flakes, minerals, heterocyclic compounds, cyclic compounds, fluorescent compounds, phosphorescent compounds, dyes, inks, carbon black, or any other substance or compound that reflects light or absorbs light.

One aspect, among others, provides a flexographic ink vehicle or a flexographic ink additive comprising about 3 to 40 wt. % of a fumaric modified rosin or resin ester or salt thereof and about 15 to about 70 wt. % of a maleic modified rosin or resin ester or salt thereof in a water soluble solvent. The water soluble solvent includes, but is not limited to, water, and can optionally include alcohols, pyrrolidone, and polar solvents. For example, pyrrolidone can be optionally present in about 1 to about 5 wt. %. A representative pyrrolidone includes, but is not limited to, alkyl substituted pyrrolidone such as n-methyl pyrrolidone. The flexographic ink vehicle or additive optionally includes an anti-foaming agent. The anti-foaming agent can be present in at least about 0.1 wt. %. More or less anti-foaming agent can be added as necessary to achieve the desired consistency of the ink vehicle.

In some aspects, the modified rosin esters are complexed with a cation to form a salt. Representative cations include, but are not limited to, amines such as primary amines and alkyl amines, ammonium ions, and alkyl ammonium ions. For example, the ink vehicle or additive can include about 3 to about 20 wt % of a solution of 28-30 wt % ammonia. More specific cations include, but are not limited to, ethanolamine or diethanolamine, and the like.

Another aspect provides a flexographic ink composition including about 3 to about 40 wt. % of a fumaric modified ester of tall oil rosin and about 15 to about 70 wt. % of a maleic modified rosin ester in combination with at least one colorant.

Yet another aspect provides a method of producing a flexographic ink additive or vehicle by admixing about 3 to 40 wt. % of a fumaric modified rosin or resin ester or salt thereof, and about 15 to about 70 wt. % of a maleic modified rosin or resin ester or salt thereof. The salts can be ammonium salts. About 3 to about 20 wt. % of a 28% ammonia solution can be added to adjust the pH of the composition and facilitate the formation of modified rosin ester salts. The method also includes further optionally admixing about 5 to about 12 wt. % anhydrous alcohol, and about 1 to about 12 wt % dimethylethanolamine (DMEA). Additionally, the method optionally includes admixing at least about 0.1 wt. % of an anti-foaming agent into the flexographic ink vehicle and/or about 1 to about 5 wt. % of a pyrrolidone.

Additional water soluble solvent can be added to the admixture to convert the product from an ink additive to an ink vehicle. The amount of the water soluble solvent can vary as needed. In one aspect the amount of the water soluble solvent can range from about 25% to about 75% by weight. Typically dimethylethanolamine (DMEA) would also be added to the admixture to convert the product from an ink additive to an ink vehicle. The ink vehicle can be converted to an ink composition by adding the aforementioned colorant.

Other compositions, methods, features and advantages of the disclosed ink vehicles, ink additives and printing inks will be or become apparent to one with skill in the art upon examination of the following drawings and detailed description. It is intended that all such additional compositions, methods, features, and advantages be included within this description, be within the scope of the present invention, and be protected by the accompanying claims.

DETAILED DESCRIPTION

Embodiments of the present disclosure generally provide flexographic ink vehicles, flexographic ink additives, and flexographic ink compositions. Some embodiments of the described compositions include water-based, water-soluble, or water-miscible compositions suitable for use with flexographic printing presses. It has been discovered that flexographic ink vehicles, ink additives, and ink compositions containing at least two naturally occurring polymers, for example modified rosin esters, provide improved flexographic ink vehicles, additives and compositions. The disclosed compositions reduce ghosting, improve the color density of printed ink, and have a better gloss than existing flexographic ink compositions. Cleaner colors can be achieved with the disclosed compositions using less bases or pigments. Moreover, the disclosed compositions contain natural ingredients that minimize adverse effects on the environment.

One embodiment provides a flexographic ink vehicle, ink additive or ink composition having about 3 to about 40 wt. % of a fumaric modified rosin or resin, or ester or salt thereof in combination with about 15 to about 70 wt. % of a maleic modified rosin or resin, or ester or salt thereof. A representative fumaric modified rosin ester includes, but is not limited to, fumaric modified ester of tall oil rosin. Polymers, resins, or rosins bind pigment to the substrate. Additionally, the polymers contribute to the properties of hardness, gloss, adhesion and flexibility in the ink. For example, adding the fumaric modified rosin ester or salt thereof provides additional gloss, and thixotropic body especially for higher line anilox rolls in flexographic printing systems, and helps keep the composition from breaking down.

The polymers used in the disclosed compositions are naturally occurring rosins. Rosin is a natural substance usually obtained from pine trees. It largely comprises structurally similar C-20 monocarboxylic acids that are known as, and are referred to hereinafter as resin acids. Rosin also frequently contains fatty acids, decarboxylated resin acids, and resin acid dimers and anhydrides. The composition of rosin will vary depending on the species of tree from which it is isolated, the location and season of the isolation, and the manner of isolation. For instance, gum rosin is the sap collected when a pine trunk is wounded, and tall oil rosin is a byproduct of the paper making process. Examples of the rosins which can be utilized to prepare the disclosed compositions include tall oil rosin, distilled tall oil rosin, gum rosin, wood rosin, and esters, modified rosins, esters, modified esters and salts thereof. Maleic and fumaric modified rosin esters and ester salts thereof are particularly suitable. Additional polymers that can be used are naturally occurring resins, such as maleic and fumaric modified resins; resin esters and salts thereof.

Certain embodiments of the flexographic ink vehicles, ink additives and ink composition also contain a water or aqueous base, for example a water soluble or water miscible solvent. Generally, the solvents used in the disclosed flexographic ink compositions are capable of dissolving another substance, such as polymers, resins, or rosins to form a solution. The solvents can also dissolve materials in the vehicle, assist in dispersion of the pigments and additives and adjust viscosity. Combinations of solvents are often selected for different types of ink on the bases of printability, drying speed, economy and odor. Other embodiments contain about 25 to about 75 wt. % of the composition of water. In the case of ink vehicles, exemplary embodiments can contain typically about 50 to about 60 wt. % water, even more typically about 53 to about 58 wt. % water. In one embodiment, the disclosed flexographic compositions contain as much as 80% organic solvents. In the case of ink additives, exemplary embodiments can contain typically about 30 to about 50 wt % water.

A solution of ammonia, for example a 28-30 wt. % solution of ammonia, can be added to the flexographic compositions. The ammonia solution provides a source of cations to form salts with the polymers and can help solubilize the rosins or resins. It will be appreciated that any cation or source of cations can be used to form a salt with, for example, the maleic modified rosin esters, the fumaric modified ester of tall oil rosin, or both. Typically, about 3 to about 20 wt. % of a 28 wt. % solution of ammonia can be added, more typically about 5 to about 12 wt % of the composition.

In still other embodiments, one or more organic solvents are optionally added to a water base. A representative combination of solvents is about 45 to about 55 wt. % water combined with less than about 5% pyrrolidone, typically less than about 3%, even more typically about 2.5 wt. % or less of, for example, n-methyl pyrrolidone, and about 5 to about 12 wt. % of an alcohol, typically anhydrous alcohol. The anhydrous alcohol can also serve as an esterifying agent to esterify reactive groups on the modified rosins. Exemplary alcohols include but are not limited to primary aliphatic alcohols such as ethanol, n-propanol, and n-butanol and ether alcohols such as diethylene glycol monomethyl ether and ethylene glycol n-butyl ether, and amino-alcohols such as dimethylaminoethanol. Alcohol can speed up the surface drying of an ink made from the vehicle.

Suitable organic solvents include, but are not limited to, pyrrolidone, alcohol, methanol, acetonitrile, ethanol, oxydipropionitrile, alky substituted pyrrolidone such as n-methyl pyrrolidone, and amino alcohols. The solvent can be selected to produce a flexographic ink composition that stays open and flows during the printing process and does not dry too fast.

Other bases, including but not limited to, water-soluble amines such as morpholine, triethanolamine, monoethanolamine, and dimethylethanolamine (DMEA), or alkali and alkaline earth hydroxides such as potassium hydroxide and sodium hydroxide can also be used to generate salts. The bases form salts with the modified rosin esters to increase the solubility of these components in water. The base can be present in about 1 to about 12 wt. % of the composition, typically in about 1 to about 3.5 wt. %. DMEA, for example, raises the pH of the vehicle and keeps it open and stable.

The disclosed flexographic ink vehicles, additives and ink compositions can also optionally contain an antifoaming agent. Examples of antifoaming agents include, but are not limited to, fluorine-containing compounds, silicone type compounds, and chelate agents, a typical example of which is EDTA. One or more antifoaming agents can be used, typically in about 0.1 wt. % to about 5 wt. % of the composition.

One particular embodiment provides a flexographic ink additive comprising about 3 to about 40 wt. % of a fumaric modified rosin ester or salt thereof, about 15 to about 70 wt. % of a maleic modified rosin ester or salt thereof in about 25 to about 75 wt. % water and about 5 to about 20 wt. % of a 28 wt. % solution of ammonia. Another embodiment provides a flexographic ink vehicle in which the base composition is the aforementioned ink additive to which about 1 to about 12 wt. % dimethylethanolamine (DMEA) is added. Typically more water is added to the ink additive to create an ink vehicle from the additive to provide a thinner ink vehicle composition than the ink additive composition.

Another embodiment provides a flexographic ink composition comprising about 3 to about 40 wt. % of a fumaric modified rosin ester, such as a fumaric modified ester of tall oil rosin or salt thereof, about 15 to about 70 wt. % of a maleic modified rosin ester or salt thereof, about 3 to about 20 wt. % of a 28-30% ammonia solution, about 1 to about 15 wt % dimethylethanolamine (DMEA) and at least one colorant in a water based solvent and optionally, about 5 to about 12 wt. % anhydrous alcohol, about 1 to about 5 wt. % of a pyrrolidone and/or about 0.1 wt. % to 5 wt. % of an anti-foaming agent.

In practice, the disclosed flexographic inks are typically prepared by a combination of batch and continuous processing in media mills, sometimes even stir ball mills. These types of inks are typically processed only in totally enclosed dispersion systems when very volatile solvents are used.

Generally, sufficient quantities of the base(s) are incorporated into the solution so that the pH of the solution is in the range of 8.0 to 10.0, preferably 8.5 to 9.5. This helps keep the ink on the alkaline side which allows for better transferability of the ink onto the desired printed substrate and a more fluid and flowable ink. Ammonia can be used to adjust the pH to this range. Rice extract can also be used to adjust the pH.

Other components that may be incorporated into the resin vehicle or additive are other water-soluble and/or water-dispersible thickeners, wax emulsions, biocides, corrosion inhibitors, antifoam agents, surfactants, and up to about 12% of an alcohol such as isopropanol.

To prepare the ink composition the resin vehicle is generally combined with additional water and with the desired coloring agent and milled to disperse the coloring agent to the greatest extent possible.

The ink vehicles, ink additives and ink compositions described herein provide improved tackiness and thus improved transferability of the ink from a flexographic press to the substrate to be printed. The combination and concentration of rosins in the combinations provides this increased transferability resulting in reduction and potentially complete elimination of ghosting. It also results in the printing of stronger colors, especially on clay coated board, requiring less ink for printing as well as allowing use of less pigment to achieve the desired printing. The improved transferability also allows for increased press speed and easier cleaning of the press as a result of more ink being transferred to the printed substrate and less ink left on the press. The ink vehicles and ink compositions herein provide considerable cost savings over inks currently used. The ink additives described herein when combined with conventionally available flexographic inks provide the same advantages.

The compositions of this disclosure will be further described by the following examples which are not intended to limit the scope of this disclosure.

EXAMPLE 1

A representative flexographic ink vehicle was prepared by combining the following, by weight percent:

| | |
|---|---|
| water | 50.9% |
| anhydrous alcohol | 6.0% |
| dimethylethanolamine (DMEA) | 3.0% |
| 28% solution ammonia | 5.0% |
| n-methyl pyrrolidone | 2.0% |
| Base SM 705 Dry Resin Tree By Product | 28.0% |
| Base 8112 Dry Resin Tree By Product | 5.0% |
| anti-foaming agent. | 0.1% |

SM 705 Dry Resin Tree By Product is a maleic rosin ester commercially available from MeadWestvaco. Base 8112 Dry Resin Tree By Product is a fumaric modified ester of tall oil rosin commercially available from Arizona Chemical. The components were mixed in a container with agitation.

Briefly, 174 lbs of 80° C. water was combined with 20 lbs of anhydrous alcohol and 10 lbs of DMEA. Approximately 18 lbs of a 28% ammonia solution was then added. About 7 lbs of NMP, 96 lbs of SM 705 Dry Resin Tree By Product, 17 lbs of Base 8112 Dry Resin Tree By Product were slowly combined. About 0.25 lbs of an antifoaming agent was added. The final viscosity was about 12 to 16 seconds in a #3 Zhan. The final pH was between about 9.6 and about 9.9.

EXAMPLE 2

Another representative flexographic ink vehicle was prepared in a manner similar the method of Example 1, by combining the following by weight percent:

| | |
|---|---|
| water | 54% |
| dimethylethanolamine (DMEA) | 1% |
| 28% solution ammonia | 12% |
| SM 705 rosin | 30% |
| 8112 Rosin | 3% |

EXAMPLE 3

A representative flexographic ink additive was prepared in a manner similar to the method of Example 1, by combining the following by weight percent:

| | |
|---|---|
| Water | 45% |
| 28% solution ammonia | 10% |
| SM 705 Rosin | 40% |
| 8112 Rosin | 5% |

EXAMPLE 4

Another representative flexographic ink additive was prepared having the following composition, by weight percent:

| | |
|---|---|
| Hot water 65-115° C. | 40% |
| Isopropyl Alcohol | 7% |
| DMEA | 3% |
| 28% Ammonia | 5% |
| 8112 Rosin | 5% |

EXAMPLE 5

The ink additive of Example 3 was added to standard inks of three different colors to test the effect of the additive on the density of printed inks with the results presented below. The standard inks were water-based flexographic inks manufactured by Poteet Printing Systems, Charlotte, N.C. Samples of the standard inks and the standard inks with 5-10% by weight of an exemplary composition of the present ink additive added to the standard inks were printed on clay coated paper combined to create corrugated sheet using a new 7-color rotary die cutter (RDC) (66×113) equipped with infra-red (IR) dryers. Density readings were taken with an X-Rite 530 spectrophotodensitometer. The readings showed increases of at least about 16% color density when combining the present additive with the standard inks.

| Standard Ink | Density of Standard Ink | Density of Standard Ink with Present Additive | % Increase |
|---|---|---|---|
| Magenta | 1.33 | 1.55 | 16.5% |
| Cyan | 1.54 | 2.01 | 30.5% |
| Yellow | 0.87 | 1.12 | 28.7% |

It should be noted that the results of this type of test can vary depending on the anilox roll in the flexographic press, the ink cell and ink base load. These examples were printed with 450/3.5 volume anilox rolls.

EXAMPLE 6

The ink additive of Example 3 was added to standard inks of various colors to test the effect of the additive on elimination of ghosting. The standard inks were water-based flexographic inks manufactured by Poteet Printing Systems, Charlotte, N.C., of the colors process cyan, process magenta, process yellow, and process black. Sample printing jobs running the standard inks and the standard inks after adding 7% by weight of the present additive on clay coated paper combined to create corrugated sheets. Images printed using only the standard inks and the standard inks with the present additive were printed on a new 66×113 7-color rotary die cutter (RDC) equipped with infra-red (IR) dryers. The standard inks without the present additive showed ghosting with a press speed at 3600 sheets per hour. The inks after adding 7 wt. % (45 oz.) of the present additive showed no ghosting with a press speed at 3600 sheets per hour and permitted the press speed to be increased to 4200 sheets per hour without ghosting.

EXAMPLE 7

Representative costs of ink compositions comprised of conventionally available ink components were compared to the costs for examples of the present ink compositions comprised of the ink vehicle of Example 2 above and various colorants. All of the components of the compositions were purchased from Poteet Printing Systems, Charlotte, N.C. A blue ink composition comprised of the conventionally available components listed below has a current cost of $5.73 per pound:

| | |
|---|---|
| Cyan blue base | 35% |
| Methyl violet base | 14.1% |
| GC45 trans extender | 36.4% |
| HR was compound | 14.0% |

In contrast the essentially same blue color ink composition comprised of the following components including the present ink vehicle has a current cost of $3.77:

| | |
|---|---|
| Ink vehicle of Example 2 | 75.0% |
| Cyan blue base | 17.0% |
| Methyl violet base | 8.0% |

A red ink composition comprised of the following components has a current cost of $4.94:

| | |
|---|---|
| Black base | 0.4% |
| Rubine red base | 53.0% |
| GC45 trans extender | 25.2% |
| HS yellow base | 21.4% |

In contrast the essentially same red color ink composition comprised of the following components including the present ink vehicle has a current cost of $3.62:

| | |
|---|---|
| Ink vehicle of Example 2 | 62.4% |
| Black base | 0.4% |
| Rubine red base | 26.5% |
| HS yellow base | 10.7% |

It can be seen from the above description that compositions are provided for flexographic ink vehicles, ink additives and printing inks. The compositions as described above provide improved flexographic printing. In particular, the present compositions eliminate ghosting, allow for higher printing speeds and result in higher color density in printed images. Additionally, a method of manufacture of the present compositions is provided.

It should be emphasized that the above-described embodiments of the present compositions and method, particularly, any "preferred" embodiments, are merely possible examples of implementations, merely set forth for a clear understanding of the principles of the invention. Many variations and modifications may be made to the above-described embodiment(s) without departing substantially from the spirit and principles of the invention. All such modifications and variations are intended to be included herein within the scope of this disclosure and protected by the following claims.

What is claimed is:

1. A method of producing a composition for use as a flexographic water-based ink vehicle, ink additive or printing ink comprising admixing (a) two or more rosins, the rosins being selected from the group consisting of tree rosins, tall oil rosins, gum rosins, wood rosins, and esters and salts thereof, wherein the rosins consist of a fumaric modified rosin or resin and a maleic modified rosin or resin, wherein:
(i) the fumaric modified rosin or resin is present in an amount of about 3 to about 40 wt. % based on the weight of the composition excluding any colorant present; and
(ii) the maleic modified rosin or resin is present in an amount of about 15 to about 70 wt. % based on the weight of the composition excluding any colorant present.

2. The method of claim 1, wherein the fumaric modified rosin or resin is a fumaric modified rosin or resin ester or ester salt thereof, and the maleic modified rosin or resin is a maleic modified rosin or resin ester or ester salt.

3. The method of claim 1, further admixing a water soluble solvent.

4. The method of claim 3, wherein the water soluble solvent is water present in about 25% to about 75% by weight of the composition excluding any colorant present.

5. The method of claim 4, further admixing a pyrrolidone in the range of about 1 to about 5 wt. % of the composition excluding any colorant present.

6. The method of claim 2, wherein the maleic modified rosin or resin is a maleic modified rosin ester salt and the fumaric modified rosin or resin is a fumaric modified rosin ester salt.

7. The method of claim 6, wherein the salts are ammonium salts.

8. The method of claim 4, further admixing about 5% to about 12% by weight of the composition of a solution of about 28% to about 30% by weight of ammonia excluding any colorant present.

9. The method of claim 6, wherein the fumaric modified rosin ester salt is a salt of a fumaric modified ester of tall oil rosin.

10. The method of claim 1, further admixing a colorant.

11. The method of claim 1, wherein the modified rosins or resins are complexed with a cation to form salts.

12. The method of claim 11, wherein the cation is selected from the group consisting of amines, ammonium ions and alkyl ammonium ions.

13. The method of claim 3, further admixing an organic solvent.

14. The method of claim 13, wherein the organic solvent is anhydrous alcohol present in about 5% to about 12% by weight of the composition excluding any colorant present.

15. The method of claim 8, further admixing a base present in about 1% to about 12% by weight of the composition excluding any colorant present.

16. The method of claim 15, wherein the base is selected from the group consisting of water-soluble amines, and alkali and alkali earth metal hydroxides.

17. The method of claim 16, wherein the base is dimethylethanolamine.

18. A composition for use as a flexographic water-based ink vehicle, ink additive or printing ink comprising:
(a) an admixture of two or more rosins, the rosins being selected from the group consisting of tree rosins, tall oil rosins, gum rosins, wood rosins, and esters and salts thereof, wherein the rosins consist of a fumaric modified rosin or resin and a maleic modified rosin or resin, wherein:
(i) the fumaric modified rosin or resin is present in an amount of about 3 to about 40 wt. % based on the weight of the composition excluding any colorant present; and
(ii) the maleic modified rosin or resin is present in an amount of about 15 to about 70 wt. % based on the weight of the composition excluding any colorant present.

19. The composition of claim 18, wherein the fumaric modified rosin or resin is an ester or ester salt thereof, and the maleic modified rosin or resin is an ester or ester salt thereof.

20. The composition of claim 18, further comprising a water soluble solvent.

21. The composition of claim 20, wherein the water soluble solvent is water present in about 25% to about 75% by weight of the composition excluding any colorant present.

22. The composition of claim 21, wherein the water soluble solvent further includes a pyrrolidone excluding any colorant present.

23. The composition of claim 22, wherein the pyrrolidone is n-methyl pyrrolidone in the range of about 1 to about 5 wt. % of the composition excluding any colorant present.

24. The composition of claim 20, further comprising an anti-foaming agent.

25. The composition of claim 20, wherein the maleic modified rosin is a maleic modified rosin ester salt and the fumaric modified rosin is a fumaric modified rosin ester salt.

26. The composition of claim 25, wherein the salts are ammonium salts.

27. The composition of claim 21, further comprising about 3% to about 20% by weight of the composition of a solution of about 28% to about 30% by weight of ammonia excluding any colorant present.

28. The composition of claim 25, wherein the fumaric modified rosin ester salt is a fumaric modified ester of tall oil rosin.

29. The composition of claim 18, further comprising a colorant.

30. The composition of claim 18, wherein the modified rosins or resins are complexed with a cation to form salts.

31. The composition of claim 30, wherein the cation is selected from the group consisting of amines, ammonium ions and alkyl ammonium ions.

32. The composition of claim 31, wherein the amines are either ethanolamine or diethanolamine or both.

33. The composition of claim 20, further including an organic solvent.

34. The composition of claim 33, wherein the organic solvent is selected from the group consisting of pyrrolidones, alcohols and nitriles.

35. The composition of claim 34, wherein the pyrrolidones are alkyl substituted pyrrolidones.

36. The composition of claim 34, wherein the alcohols are selected from the group consisting of primary aliphatic alcohols, ether alcohols and amino alcohols.

37. The composition of claim 34, wherein the nitriles are selected from the group consisting of acetonitrile and oxydipropionitrile.

38. The composition of claim 33, wherein the organic solvent is anhydrous alcohol present in about 5% to about 12% by weight of the composition excluding any colorant present.

39. The composition of claim 27, further comprising a base present in about 1% to about 12% by weight of the composition, excluding any colorant present.

40. The composition of claim 39, wherein the base is selected from the group consisting of water-soluble amines, and alkali and alkali earth metal hydroxides.

41. The composition of claim 39, wherein the base is dimethylethanolamine.

42. The composition of claim 18 for use as a flexographic ink additive, further comprising a cation present in about 5% to about 12% by weight of the composition excluding any colorant present and a water soluble solvent.

43. The composition of claim 42, wherein the cation is a solution of about 28% to about 30% by weight of ammonia, and the water soluble solvent includes water present in about 25% to about 75% by weight of the composition excluding any colorant present.

44. The composition of claim 43, wherein the rosins are rosin or resin esters.

45. The composition of claim 18 for use as a flexographic ink vehicle, further comprising a cation present in about 5% to about 12% by weight of the composition, a base present in about 1% to about 12% by weight of the composition, and a water soluble solvent, the percentages by weight of the composition being determined as a weight percent of the composition excluding any colorant present.

46. The composition of claim 45, wherein the cation is a solution of about 28% to about 30% by weight of ammonia, the base is dimethylethanolamine, and the water soluble solvent includes water present in about 25% to about 75% by weight of the composition, the percentages by weight of the composition being determined as a weight percent of the composition excluding any colorant present.

47. The composition of claim 45, wherein the rosins are rosin or resin esters.

48. The composition of claim 18 for use as a flexographic printing ink, further comprising a cation present in about 5% to about 12% by weight of the composition, a base present in about 1% to about 12% by weight of the composition, a water soluble solvent, and a colorant, the percentages by weight of the composition being determined as a weight percent of the composition excluding any colorant present.

49. The composition of claim 48, wherein the cation is a solution of about 28% to about 30% by weight of ammonia, the base is dimethylethanolamine, and the water soluble solvent includes water present in about 25% to about 75% by weight of the composition, the percentages by weight of the composition being determined as a weight percent of the composition excluding any colorant present.

50. The composition of claim 48, wherein the rosins are rosin or resin esters.

51. The composition of claim 20, wherein the pH of the composition is adjusted to be in the range of about 8 to about 10.

52. The composition of claim 18, further including one or more of a water-soluble or water-dispersible thickener, a wax emulsion, a biocide, a corrosion inhibitor, or a surfactant.

53. The composition of claim 18, further comprising:
 (b) a 28-30 wt % ammonia solution present in about 3 to about 20 wt. % of the composition;
 (c) dimethylethanolamine present in about 1 to about 15 wt % of the composition; and
 (d) water; and optionally one or more of,
 (e) anhydrous alcohol present in about 5 to about 12% by weight of the composition;
 (f) pyrrolidone present in about 1 to about 5% by weight of the composition; and
 (g) an anti-foaming agent present in about 0.1 to about 5% of the composition;
 the percentages by weight of the composition being determined as a weight percent of the composition excluding any colorant present.

54. The composition of claim 18, wherein the composition is a flexographic ink additive, further comprising:
 (b) water present in about 25 to about 75 wt. % of the composition; and
 (c) a 28-30 wt. % solution of ammonia present in about 5 to about 20 wt. % of the composition;
 the percentages by weight of the composition being determined as a weight percent of the composition excluding any colorant present.

55. The composition of claim 18, wherein the composition is a flexographic ink vehicle, further comprising:
 (b) dimethylethanolamine present in about 1 to 12 wt. % of the composition excluding any colorant present.

56. The composition of claim 18, wherein the composition is a printing ink, further comprising:
 (b) water present in about 25 to about 75 wt. % of the composition;
 (c) a 28-30 wt. % solution of ammonia present in about 5 to about 20 wt. % of the composition;
 (d) dimethylethaneolamine present in about 1 to 12 wt. % of the composition excluding colorant; and
 (e) a colorant;
 the percentages by weight of the composition being determined as a weight percent of the composition excluding any colorant present.

57. The composition of claim 53, further comprising a colorant.

* * * * *